June 5, 1956

C. C. MELTON 2,748,650

MOVIE FILM VIEWING APPARATUS

Filed Feb. 26, 1951

INVENTOR.
Charles C. Melton
BY Llewellyn A. Young
his attorney

June 5, 1956   C. C. MELTON   2,748,650
MOVIE FILM VIEWING APPARATUS
Filed Feb. 26, 1951   2 Sheets-Sheet 2

INVENTOR.
Charles C. Melton
BY Llewellyn A. Young
his attorney

United States Patent Office 2,748,650
Patented June 5, 1956

2,748,650
MOVIE FILM VIEWING APPARATUS

Charles C. Melton, Reno, Nev.

Application February 26, 1951, Serial No. 212,708

5 Claims. (Cl. 88—18)

This invention relates to movie film viewing apparatus and more particularly to portable manually operated movie viewers.

An object of this invention is the provision of apparatus of the above character having novel means for controlling the movement of the film therethrough.

Another object of the invention is the provision of a movie viewer that is easy to operate, that has a minimum of parts, that is compact, that may be readily and easily handled by the operator, that has a minimum of adjustments, that is simple to construct, that is inexpensive to produce and that is rugged.

Another object of the invention is the provision of a movie viewer of the above character in which the film to be viewed may be readily loaded in the viewer and removed therefrom.

Another object of the invention is the provision of a novel mechanism in apparatus of the above character for framing the viewed area of the film.

Another object of the invention is the provision of novel means for adjusting the picture framing means.

Another object of the invention is the provision of novel means for mounting and arranging the film take-up and film supply reels.

Another object of the invention is the provision of novel means associated with the take-up and supply reels for preventing overlapping build up of the film on the reels or entanglement of the film as it passes through the viewer.

Other objects and advantages will become more apparent upon reference to the accompanying drawings in which.

Figure 4:
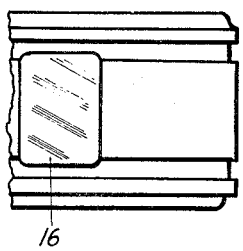
Figs. 4 and 5 are fragmentary side views of the upper portion of the casing.
Figure 3:
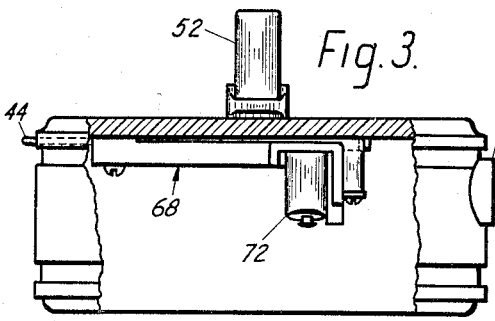
Fig. 3 is a plan view with a portion of the top cut away.
Figure 5:
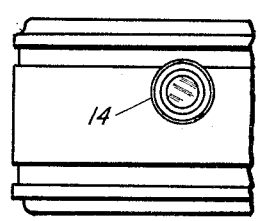

Referring now to the drawings, the invention is shown embodied in a film viewer for viewing movie films 11, such as 8 millimeter home movie films or the like, having perforations 12 along one edge and commercially available at photography and department stores. While the embodiment of the invention shown herein is adapted for 8 millimeter film use, it is to be understood that the same principle of operation can also be applied for any size film.

In this embodiment of the invention the film viewer includes in general a casing 13, an eyepiece 14, a light-admitting window 16, a film supply reel 17, a film take-up reel 18, adjustable film framing means 19 between the eyepiece 14 and the window 16 for positioning and framing the film for observation through the eyepiece as the film passes from the film supply reel 17 to the take-up reel 18 and force-responsive means for effecting a step-by-step movement of the film through the viewer.

Figure 2:
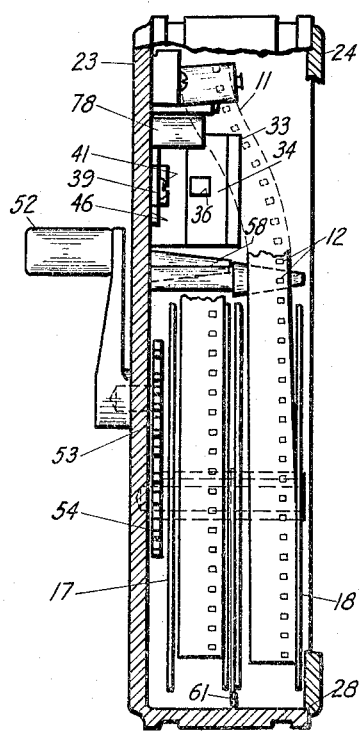
Fig. 2 is a side view with a portion of the side cut away.
Figure 1:
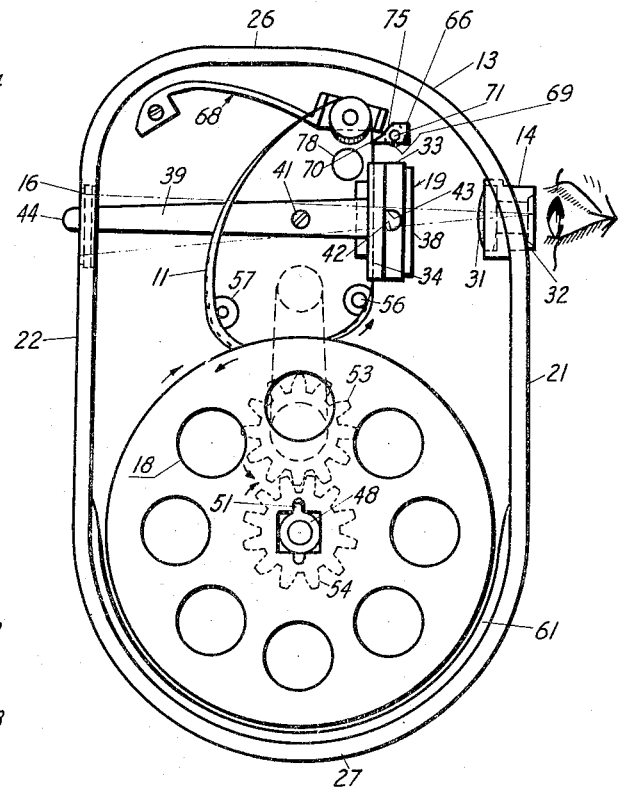
Figure 1 is a front elevational view of a film viewer with the cover removed and embodying the present invention.

As best seen in Figures 1 and 2 the casing is formed by spaced sides 21 and 22 and 23 and 24 and a top 26 and a bottom 27 shaped to define a rectangular cavity having straight sides and a top and bottom curved as shown for snugly receiving the reels 17 and 18, the film framer 19 and the other operating parts. For purposes of simplifying the construction the sides 21, 22, and 23 and top 26 and the bottom 27 are formed as an integral unit. The side 24 forms a cover and is removable in its entirety to permit access to the working parts and the ready loading and unloading of films. The cover is formed with a peripheral shoulder 28 shaped to be snugly received in the opening defined by the sides 21 and 22, the top 26, and the bottom 27. The shoulder 28 is preferably formed so that a tight fit exists between the integral unit and the cover 24 so that the cover is held snugly in place yet may be readily removed by the insertion of a finger nail between the parts.

The eyepiece 14 is formed by a lens 31 retained in a tubular member 32. The latter is supported by the side 21 adjacent the top of the casing 13 as best seen in Figure 1. The light-admitting window 16 has a generally rectangular shape and is supported on the opposite side 22 of the casing to be in alignment with the eyepiece 14. The film framer 19 is disposed between the eyepiece 14 and the window 16 and is formed by an elongated body 33 having a vertically extending groove 34 as viewed in Figure 1 for receiving the film.

Extending horizontally through the body 33 is a rectangular shaped aperture 36 in alignment with the eyepiece 14 and the window 16 for the purpose of framing pictures on the film.

One aspect of the invention is concerned with means for mounting the film framer for vertical adjustment. To this end the film framer body 33 is held on the side 23 by suitable vertical ways 38. Movement of the framer body 33 is controlled by a lever 39 pivotally mounted intermediate its ends as by a screw 41 threaded into the side 23 of the casing. One end 42 of the lever 39 is rounded for reception in a socket 43 formed in the framer body 33. The opposite end 44 of the lever extends through an elongated opening 46 formed in the side 22 adjacent the window 16. The end 44 is dimensioned to project beyond the side 22 as shown in Figure 1 a sufficient distance so as to be accessible from the exterior of the casing. The ball and socket connection between the lever 39 and the framer body 33 permits of limited relative movement between the parts so that the body 33 may be moved vertically along the ways by moving the end 44 of the lever 39 up or down as required to align the aperture 36 with the pictures on the film.

The film supply reel 17 may be of any conventional construction and is mounted on a shaft 48. The latter is supported by the side 23 to project into the casing chamber adjacent the bottom of the casing. As best seen in Figures 1 and 2 the supply reel 17 is aligned with the eyepiece 14 and the film framer body 33. The film take-up reel 18 may also be of any conventional construction and is arranged to be mounted on the shaft 48 on the side of the film supply reel 17 adjacent the cover 24. An axially extending elongated rib 52 is shaped to be received in a mating notch in the reels 17 and 18 to insure that the reels rotate in unison with the shaft. Preferably the shaft 48 has a smaller diameter than the opening in the reels so that the reels fit on the shaft loosely. This loose fit insures that the reels have a limited relative movement with respect to the shaft and consequently the film does not bind with the sides of the reels as the film is being unwound from or wound on one of the reels.

While any number of different drives may be utilized for rotating the shaft 48, as will be apparent to one skilled in the art, I rotate the shaft by a crank 52 rotatably mounted on the side 23 to be accessible from the exterior of the casing 13. The inner end of the crank is provided with a gear 53 shaped to mesh with a gear 54 rigidly mounted on the shaft 48 so that movement of the gear 53 effects rotation of the reels 17 and 18.

A frusto-conical film guide post 56 rigid with the side 23 is disposed between the film framer body 33 and the film supply reel 17 for the purpose of directing the film from the supply reel into the groove 34 of the film framer. A film guide 57 is also provided adjacent the take-up reel 18 for guiding the film onto the take-up reel. As best seen in Figures 1 and 2 the film guide 57 also has a frusto-conical portion overlying the reel 18 and supported on the side 23 by a suitable support member 58 integral with the guide 57.

An arcuate shaped rib 61 is formed on the bottom 27 of the casing to be between the reels 17 and 18 to prevent the build up of film on the wrong reel or entanglement of the film.

Figure 7:
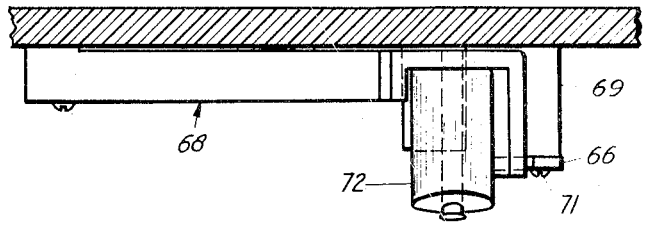
Fig. 7 is an enlarged fragmentary sectional view similar to Fig. 3 and showing the details of construction of the film control mechanism.

Another phase of the invention is concerned with means for controlling the film movement as it passes through the viewer so that it has a step-by-step movement rather than a continuous movement for all speeds of operation. In this embodiment of the invention the film control means includes a stop 66 (Figs. 6–8) shaped and positioned to normally engage the film and hold it against movement, and a film disengaging member or displacer 67 responsive to a pre-selected pulling force applied to the film by the take-up reel for disengaging the film from the stop 66, resilient means 68 operable when the film is disengaged from the stop 66 to move the film displacer 67 to position clear of the film and to move the film to a position so that the stop again engages the film and arrests movement thereof.

Figure 6:
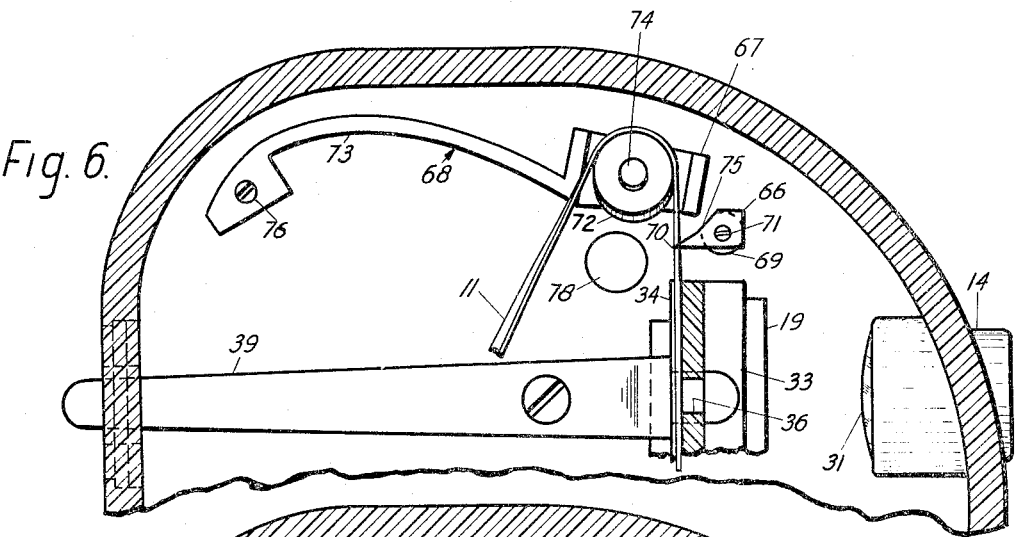
Figs. 6 and 8 are elevation views of Figure 7 showing different operational positions of the film control mechanism.
Figure 8:
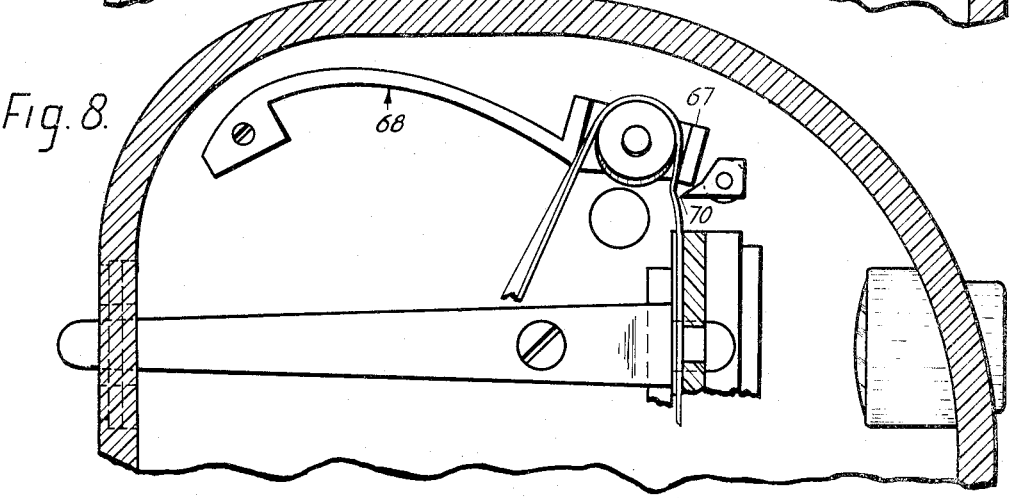

The stop 66 in this instance is formed by a generally triangular shaped member secured to a post 69 as by a screw 71. The post 69 projects inwardly of the casing chamber from the side 23 a sufficient distance so that the point 70 of the stop may be received in one of the perforations 12 along the edge of the film 11. As best seen in Figures 6 and 8 the lower edge of the stop 66 facing the film framer means 19 is substantially perpendicular to the film path so that when the film engages the stop 66 movement of the film is arrested. The upper edge 75 of the stop 66 is inclined with respect to the lower edge so that upon rewinding the film the latter automatically disengages itself from the stop 66. Preferably the stop 66 is made of some wear-resisting material such as metal or the like.

The resilient member 68 includes a roller 72 mounted on the free end of a cantilever spring member 73. The roller 72 is substantially the same width as the film and is supported on the spring member as by a pin 74 rigid with the member 73. The roller 72 is positioned so that it tends to keep the film in the groove 34 in the framer and also in engagement with the stop 66. Preferably the roller axis is inclined slightly upwardly toward the top of the casing for initially directing the film out of the path of the light entering the casing through the window 16. The spring member 73 is secured to the side 23 as by a screw 76. The spring member 73 may be made of any suitable material such as spring metal, thin cross-section synthetic resinous material, or the like. Movement of the roller 72 and spring 73 in the direction of the film framer body 33 is limited by an abutment 78 adjacent the stop 66 and rigid with the casing. The film displacer 67 is formed by a rigid arm integral with the spring member 73 and substantially parallel with the roller 72. The film displacer 67 is shaped and positioned with respect to the stop 66 so that when the spring member 73 is subjected to a pre-selected stress the displacer pushes the film to the left (as viewed in Figure 6) of the stop so that the film is clear of the stop. In the unstressed position of the spring member 73 the film displacer 67 is clear of the film such as shown in Figure 6.

Any suitable materials may be utilized in the construction of this film viewer. Where desired synthetic resinous materials may be utilized throughout the entire construction. A longer life of the stop 66 results however if that part is made of metal.

While the operation of the film viewer is readily apparent from the foregoing it may be summarized as follows:

To load the viewer the side or cover 24 is removed. The film supply and take-up reels 17 and 18 are removed from the casing. A reel with the film to be viewed is mounted on the shaft 48 so that the perforated side of the film faces outwardly the casing. The leader end of the film is then threaded about the guide 56 through the framer body 33 around the roller 72, around the guide 57, and is anchored on the take-up reel in a conventional manner. The take-up reel is then mounted on the shaft 48 in side-by-side relation with the reel 17 containing the film to be viewed. The side 24 is then replaced by forcing the shoulder 28 into the casing opening. When the cover is in the position shown in Figure 2 the sides 21 and 22, the top 26 and the bottom 27, which are of comparatively thin cross section, are stressed slightly so that a snug fit of the cover is assured.

To view the film the operator holds the viewer up to his eye and points the window 16 toward a suitable light source. The operator then turns the crank 52 counterclockwise. Such turning of the crank simultaneously rotates the film supply reel 17 and the take-up reel 18 through the gears 53 and 54 so that the film passes through the viewer in the proper manner. If the operator notices that the pictures on the film are not properly framed with respect to the eyepiece 14 the operator may move the lever 39 up or down to move the framer body 33 to a position such that the film is properly framed.

Continued turning of the crank 52 and reels 17 and 18 causes the film to be both simultaneously forced from the supply reel and to be wound up on the take-up reel. As a pre-selected frame on the film leaves the framer 19 the frame is normally urged along a path so that the pointed end of the stop 66 is received in one of the perforations along one edge of the film, adjacent the pre-selected frame. This arrests movement of the film and the subsequent frame on the film is properly framed and is momentarily held motionless. Simultaneously the take-up reel 18 is applying a pulling force to the film. As soon as the force builds up to a pre-selected value the resilient member 68 is placed under stress and the roller 72 and the displacer 67 move downwardly as viewed in Figures 6 and 8. After a pre-selected movement the film displacer 67 engages the film adjacent the stop 66 and forces the film free of the film stop 66. Concurrently the stored energy in the resilient member 68 causes the film to be pulled through the framer 19 with a very rapid motion. It is to be understood that the parts are positioned so that a film advances one frame for each movement of the spring member 68 between its opposed positions. As the resilient member 68 returns to its normal position shown in Figure 7 the roller 72 moves the film in the direction toward the stop 66 so that the latter will be received in a subsequent perforation along the film and again arrest movement of the film. It is to be understood that this action takes place comparatively rapidly. While the crank is turned continuously the film passes through the viewer in a step-by-step manner so that to the operator the action of a projector is simulated, that is, the figures, etc., have normal animated movements.

During the film viewing operation the film on the supply reel 17 is thrown outwardly of the reel. The rib 61 however prevents the film from jumping over onto the other reel or otherwise becoming entangled with the film on the take-up reel. The rib 61 also serves in the same capacity during the rewind of the film on the film supply reel 17.

When it is desired to rewind the film the operator reverses the direction of rotation of the crank 52 and the film moves in a reversed direction through the viewer. The inclined upper edge 75 on the stop 65 permits the film to automatically free itself or clear itself of the stop. The movement of film is thus not impeded during the transfer of the film from the take-up reel to the supply reel in a rewind operation.

This construction has many advantages. It is simple, rugged, and can be produced at a relatively low cost. There is a minimum of parts, particularly of moving parts, consequently the parts in this viewer are assured of having a relatively long life.

I claim:

1. In a hand-supported, manually-operable movie film viewer the combination of a casing including spaced sides, an eyepiece mounted on one of said sides, a light-transmitting window on the opposite side, a rotatably mounted shaft in said casing at one side of the eyepiece, a film supply reel in said casing arranged to be mounted on said shaft for movement therewith, a film take-up reel in said casing in side-by-side relation with said supply reel and mounted on said shaft to be rotatable therewith, crank means on the exterior of said casing for rotating said shaft and take-up reel to apply a predetermined pulling force to the film, film framing means in said casing between said eyepiece and said window for guiding the film along a pre-selected path adjacent an end of the eyepiece, a fixed stop in said casing on the opposite side of said eyepiece positioned to engage the film and hold the latter against movement, a film displacer in said casing adjacent the stop movable between a normal position in which the displacer is free of the film and a position in which it disengages the film from the stop in response to the application of said predetermined pulling force, resilient means for normally urging said displacer to its normal position and operable to store energy when the displacer is moved to its film disengaging position for returning the displacer to its normal position, a roller adjacent the stop movable between opposed positions on one side of the film path, said roller in one position normally urging said film into engagement with said stop, and resilient means for mounting said roller normally urging said roller to its normal position and operable to store energy when the roller is moved to its other position for effecting return of the roller to its normal position and advance of the film relative to the stop after the displacer moves the film free of the stop.

2. The combination recited in claim 1 wherein the stop is shaped to prevent movement of the film in one direction of travel and to permit unimpeded movement of the film relative to the stop in the opposite direction of travel.

3. In a hand-supported, manually-operable movie film viewer the combination of a casing including spaced sides, an eyepiece mounted on one of said sides, a light-transmitting window on the opposite of said sides, a rotatably mounted shaft in said casing at one side of the eyepiece, a film supply reel in said casing arranged to be mounted on said shaft for movement therewith, a film take-up reel in said casing in side-by-side relation with said supply reel and mounted on said shaft to be rotatable therewith, crank means on the exterior of said casing for rotating said shaft and take-up reel to apply a predetermined pulling force to the film, film framing means in said casing between the eyepiece and said window for guiding the film along a pre-selected path adjacent an end of the eyepiece, a fixed stop in said casing on the opposite side of said eyepiece positioned to engage the film and hold the latter against movement and resilient means in said casing adjacent the fixed stop movable between opposed positions on one side of the film path, said means in one position normally urging the film into engagement with the stop to hold the film in fixed relation with the eyepiece, and in the opposite position disengaging the film from the stop in response to the application of said force.

4. In a hand-supported, manually-operable device for viewing movie films having perforations along one edge the combination of means for guiding a film along a pre-selected path, a fixed stop having an edge shaped to fit in one of said perforations and hold the film against movement in one direction and to permit movement of the film in the reverse direction, resiliently mounted means adjacent the stop normally urging the film into engagement with the stop, a film displacer between said stop and said last mentioned means and means for mounting said displacer for movement between a position in which it is free of the film to permit engagement of the stop with the film and a position in which the displacer engages the film and disengages it from the stop in response to a pre-selected force applied to the film.

5. In a hand-supported, manually-operable film viewing device for films of the type having perforations along an edge, the combination of means for guiding the film along a pre-selected path, a stop adapted to engage a perforation in the film and hold the film against movement, a film displacer adjacent the stop movable between a normal position in which the displacer is free of the film and a position in which it disengages the film from the stop in response to a predetermined force, resilient means normally holding said displacer in its normal position and operable to store energy when the displacer is moved to its film disengaging position for returning the displacer to its normal position, a roller adjacent the stop movable between opposed positions at one side of the film path, said roller in one position normally urging said film into engagement with said stop, and resilient means for mounting said roller normally urging said roller to its normal position and operable to store energy when the roller is moved to its other position for effecting the return of the roller to its normal position and advance of the film relative to the stop after the displacer moves the film free of the stop.

References Cited in the file of this patent

UNITED STATES PATENTS

| 1,365,102 | Hochstetter | Jan. 11, 1921 |
| 2,441,829 | Miller | May 18, 1948 |
| 2,449,483 | Iwick | Sept. 14, 1948 |

FOREIGN PATENTS

| 158,242 | Great Britain | Jan. 15, 1921 |
| 775,220 | France | Oct. 8, 1934 |
| 683,460 | Germany | Nov. 7, 1939 |